Figures 1, 2:
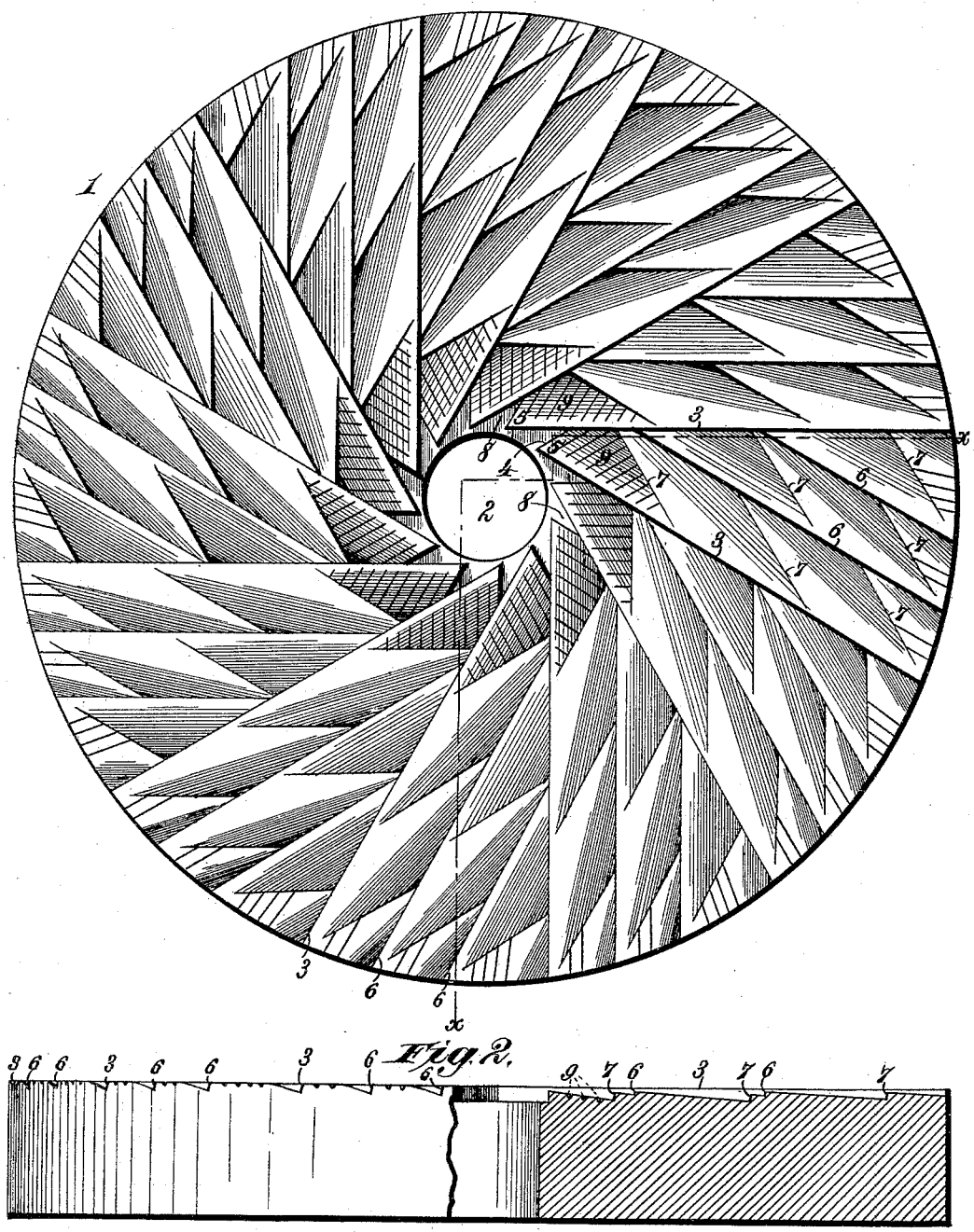

(No Model.)

G. M. SNODGRASS.
MILLSTONE DRESS.

No. 430,893. Patented June 24, 1890.

Witnesses.
Robert Garrett,
Percy B. Hills.

Inventor:
George M. Snodgrass.
By
James L. Norris.
Atty.

UNITED STATES PATENT OFFICE.

GEORGE M. SNODGRASS, OF HONEY GROVE, TEXAS.

MILLSTONE-DRESS.

SPECIFICATION forming part of Letters Patent No. 430,893, dated June 24, 1890.

Application filed April 15, 1890. Serial No. 348,009. (No model.)

*To all whom it may concern:*

Be it known that I, GEORGE M. SNODGRASS, a citizen of the United States, residing at Honey Grove, in the county of Fannin and State of Texas, have invented new and useful Improvements in a Millstone-Dress, of which the following is a specification.

My invention relates to certain improvements in methods of dressing millstones for grinding corn, wheat, and other cereals, and the purpose thereof is to provide a dress of such form that the grinding shall be accomplished immediately around the eye of the stone, where the power is exerted at the maximum advantage, and to effect a perfect finish before discharging without heating the grain, owing to the fact that by performing the grinding at or near the eye of the stone, where the surface speed is less and the power greater than at any other point upon the stone, a large percentage of friction is avoided and a very material economy of power is effected, while the grain is thoroughly ground within the shortest distance traveled.
It is my purpose also to provide a novel dress whereby the mill may be run at great speed, and will grind fast and with little heat and give a great yield and a high grade of flour or meal.
It is my further purpose to provide a millstone-dress having angular furrows intersecting the main furrows of the stone and of gradually increasing depth from their outward extremities to the points where they intersect the main furrows, said angular furrows being oppositely inclined upon the upper and lower stones to form a perfect cutting system, to discharge the grain over the face of the stone and throw it toward the skirt or edge thereof, thereby giving a good draft.

It is my purpose to provide a millstone-dress in which a series of double-angle furrows are formed about the eye of the stone to do all the heavy work in combination with angular furrows, which serve as secondary grinders and finishers, as more particularly described hereinafter.

It is my purpose, finally, to provide a millstone-dress which will give a very high quality of flour and meal, which will grind a long time without re-dressing, and which may be re-dressed with the expense of a small portion of labor and time.

To enable others skilled in the art to practice my said invention, I will proceed to describe the same in detail, reference being had to the accompanying drawings, in which—

Figure 1 is a plan view of a stone, showing a form of dress embodying my invention.
Fig. 2 is a side view partly in section.

In the said drawings the reference-numeral 1 denotes the upper stone, and the numeral 2 designates the eye or draft-circle. The face of the stone is provided with a series of main furrows 3, substantially tangential to the eye and extending to the skirt or periphery of the stone, each being intersected by a short furrow 4, by which a series of double-angle furrows 5 is formed, closely surrounding the eye
2. Diverging from each of the main or tangential furrows 3 are one or more angular furrows 6, running from the point of intersection to the skirt or periphery of the stone, and intersecting with the same and with the said main or tangential furrows are auxiliary or diminishing furrows 7, arranged at an angle with the furrows with which they intersect. At the eye of the stone the double-angle furrows 5 surround the draft-circle closely and open into angular pockets 8, which receive the grain as it comes from the hopper. Each pocket 8 is formed by a main furrow 3, substantially tangential to the eye or draft-circle of the stone and extending to its skirt and intersecting at its inner end with a short furrow 4. After forming the double-angle furrows, which are composed of the intersection of the inner ends of the main furrows 3 with the short furrows 4, I space off the remaining part of the face in from two to three parts, according to the size of the stone, and cut the parallel angular furrows 6, one, two, or more of which may intersect the main furrows. These furrows form a series of angle-shoulders, which serve to check the grain and pass it up over the face and from furrow to furrow, thus effecting a perfect finish before discharging.

In applying this dress to the stones (of which I have shown only one in the drawings) both are formed in the same manner, being faced from the skirt of the stone to the eye. When the upper and lower stones are placed together and set the proper distance apart, the first set of double-angle furrows receive and hold the grain by means of the true face surrounding the eye, where about nine-tenths of the work is done, this being the point where the speed is least and the power most advantageously exerted. Thus the grain is ground within the shortest possible travel in radial directions, and without heating.

In applying my invention I have about one-fifth face on the runner, and leave about one-fourth face on the stationary stone. The angle-furrows, forming less face to create friction, enable the mill to be run at a great speed, to grind without heating, and to give an excellent yield of a high grade.

For wheat, I prefer to cut the furrows shallow from about one-half to three-fourths of an inch at the eye, while the auxiliary furrows are cut from one-fourth to one-half an inch deep, all diminishing and disappearing on the face of the stone. The face is left true and smooth to finish up, while the furrows are left reasonably rough to do the grinding and to clean the bran.

For corn and other grains, excepting wheat, all the furrows are cut slightly deeper and left rough, and I may throw a few straw-furrows 9 upon the face, as shown in the drawings, although I do not regard this as essential.

By my invention the emptying of the grain from one angle-pocket to another gives a temporary rest and allows a slight interval for cooling, while at the same time it gives the stone opportunity to thoroughly finish it before it is discharged. In effect the process is double-acting and double-discharging.

By my invention the grinding is confined to the furrows, and not merely to a temporary dress, which has to be frequently renewed.

My dress will run for a term of years, doing all the work in the angle-furrows, the face being left smooth for finish.

What I claim is—

1. In a millstone-dress, a series of double-angle furrows surrounding the eye and opening into angular pockets which closely surround said eye, one of the furrows being substantially tangential to said eye and extending to the skirt of the stone, in combination with one or more angular furrows parallel with each other and lying at an angle with the main furrows, and diminishing or auxiliary furrows formed at an angle to both, but parallel with each other, and lying between the parallel angular furrows and extending to or toward the skirt of the stone at an angle with the radial line, substantially as described.

2. In a millstone-dress, the combination, with a series of main furrows, substantially tangential to the eye, of a series of short furrows opening into pockets 8, surrounding the eye, substantially as described.

3. In a millstone-dress, the combination, with a series of main furrows substantially tangential to the eye, of a series of short furrows opening into pockets 8, a series of angular furrows intersecting the main furrows, and a series of diminishing or auxiliary furrows at an angle with and intersecting both the main and the angular furrows, substantially as described.

4. In a millstone-dress, the combination, with a series of double-angle furrows opening into pockets 8, surrounding the eye, of a series of angular furrows running from the main furrows to the skirt of the stone, and diminishing or auxiliary furrows formed at an angle with and intersecting both the main and the angular furrows and passing into the face, substantially as described.

In testimony whereof I have affixed my signature in presence of two witnesses.

GEO. M. SNODGRASS.

Witnesses:
C. A. SCOTT,
H. M. KESNER.